No. 896,516. PATENTED AUG. 18, 1908.
H. W. CHENEY.
MOTOR CONTROL SYSTEM.
APPLICATION FILED JULY 12, 1906.
5 SHEETS—SHEET 5.
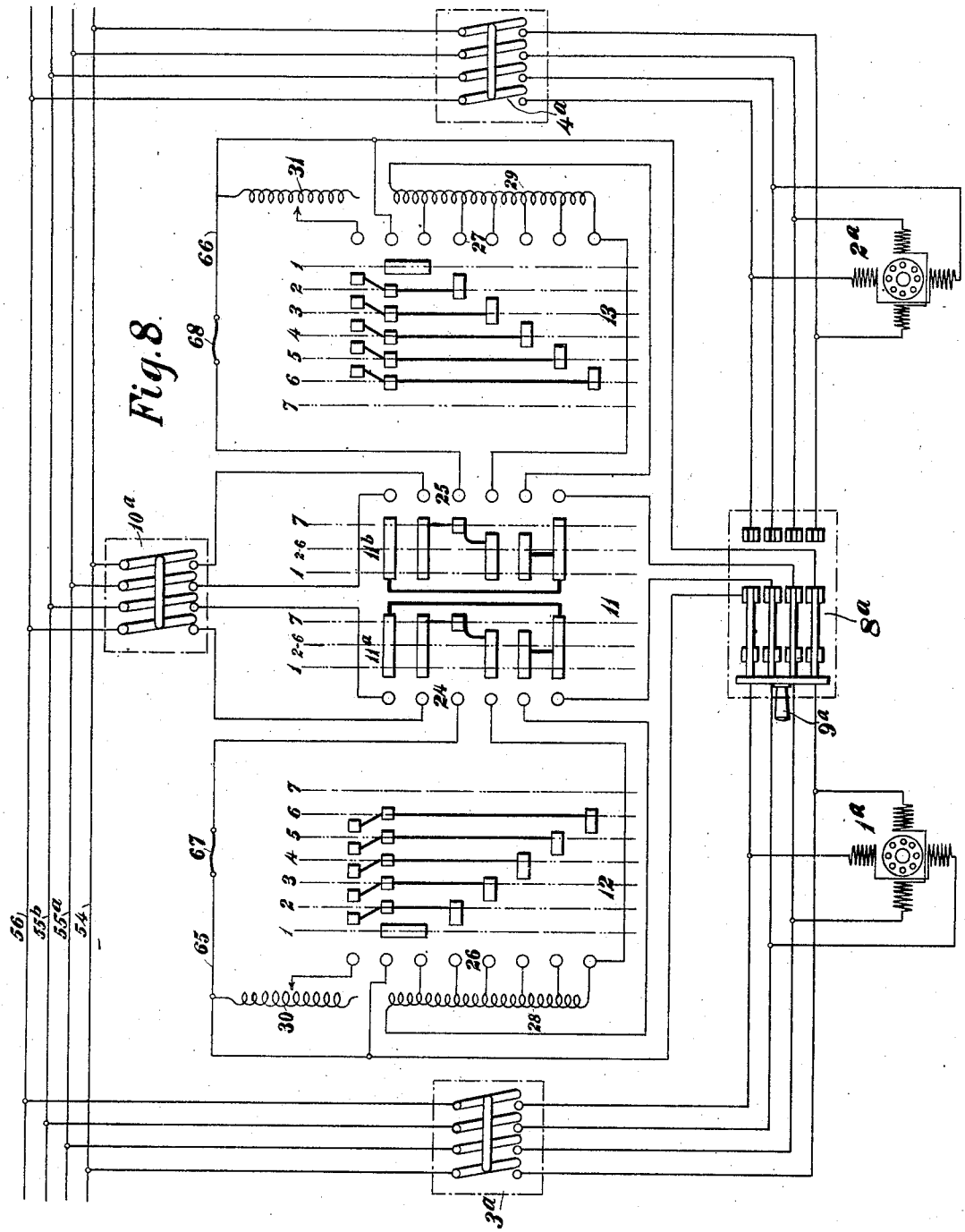
WITNESSES:
Herbert W. Cheney
INVENTOR.
BY Chas. E. Lord
ATTORNEY.

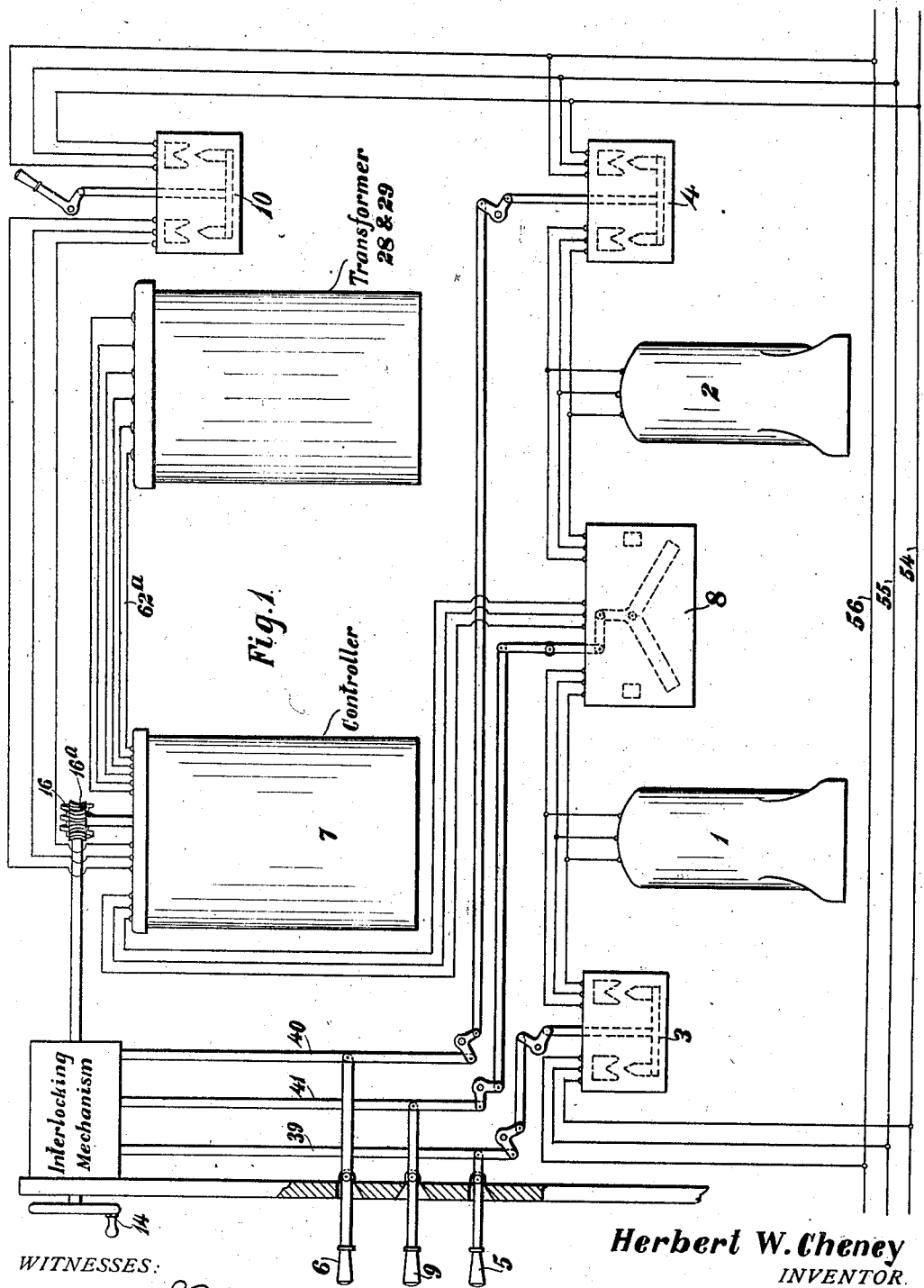

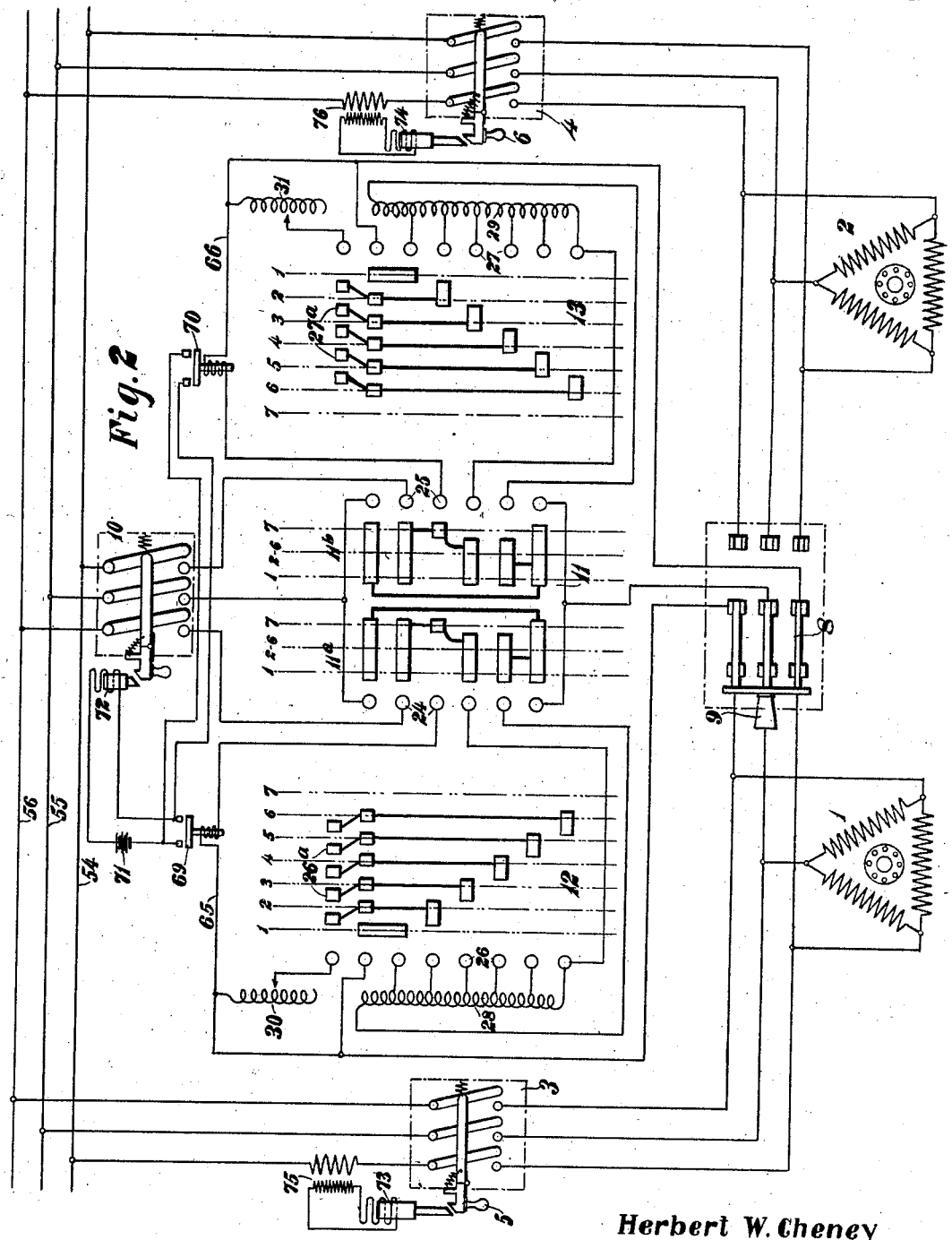

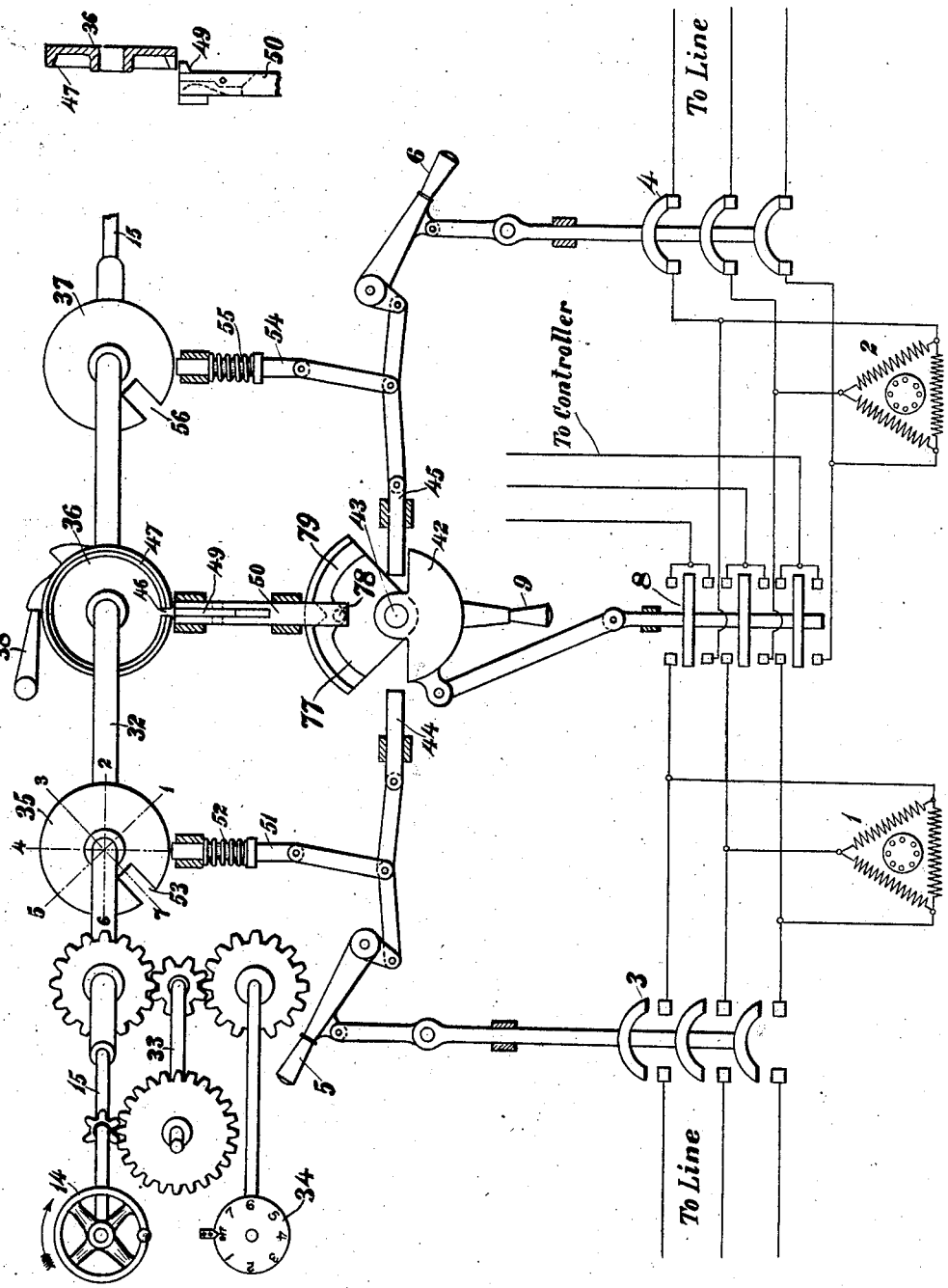

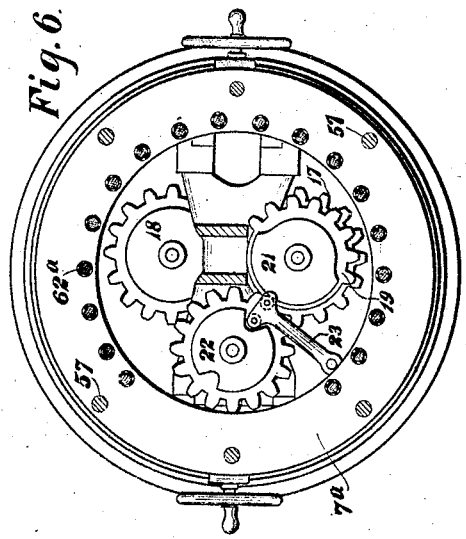
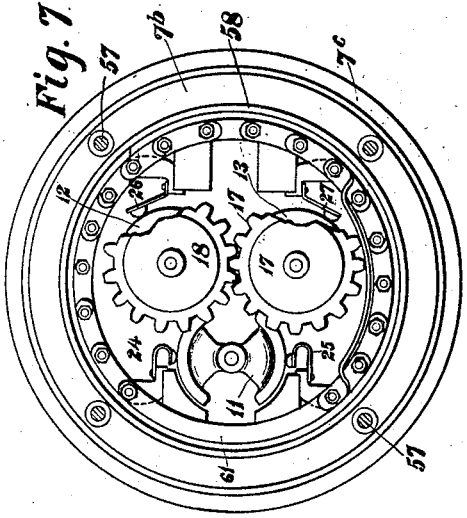
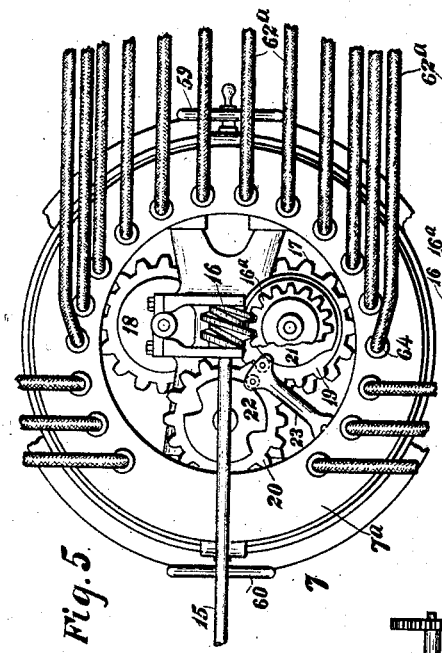
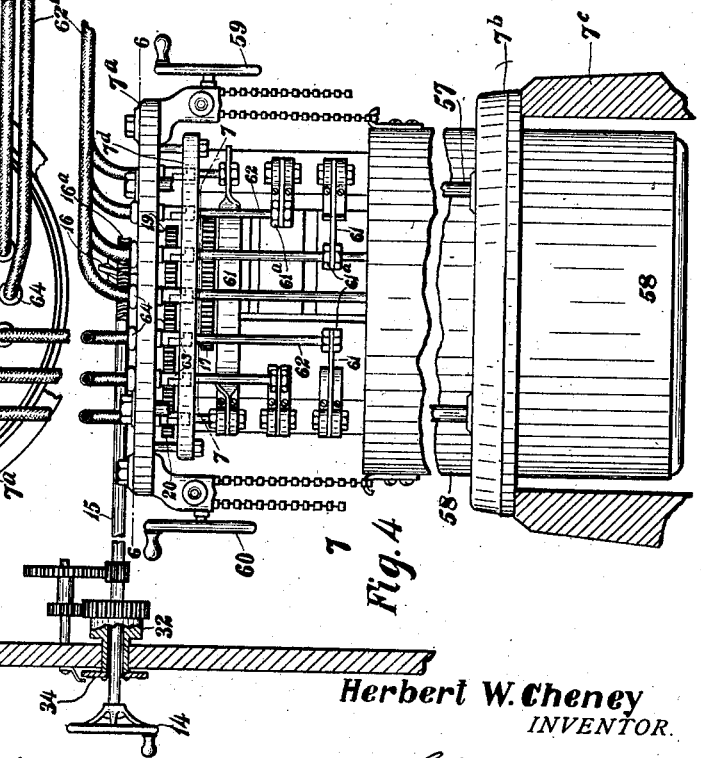

UNITED STATES PATENT OFFICE.

HERBERT W. CHENEY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 896,516.  Specification of Letters Patent.  Patented Aug. 18, 1908.

Application filed July 12, 1906. Serial No. 325,797.

*To all whom it may concern:*

Be it known that I, HERBERT W. CHENEY, citizen of the United States, residing at Norwood, in the county of Hamilton and State of Ohio, have invented certain new and useful Improvements in Motor-Control Systems, of which the following is a full, clear, and exact specification.

My invention relates to electric controllers and more particularly to potential starters for three-phase induction motors.

It has generally been the custom heretofore to have a starting controller for each motor, or for each set of motors if several were to be run together in a set. When the motors are large these controllers are necessarily very expensive and as the motors are started comparatively seldom in some kinds of work the starting controllers are often idle during the greater part of the time and there is small return for their great cost.

One of the objects of my invention is to so arrange a system that a number of different motors may be started in turn by the same starting controller and it will not be necessary to make such great expenditures as when one controller is used for each motor.

Among the other objects of my invention are to provide a system of interlocks for preventing the careless handling of the controller, to provide means for preventing arcing at the contacts of the controller, to provide a novel arrangement of controller connections, and to provide a novel scheme for arranging the conductors which lead out of the controller from the various contact fingers.

Still other objects of my invention will appear hereinafter.

In one aspect my invention consists of a motor control system, comprising a plurality of motors, a single starting controller, and connections whereby said controller can be used to start said motors separately but not more than one at a time and can leave any motor running while it controls another.

More specifically my invention consists of a plurality of induction motors, auto-transformer windings, and a controller so connected and arranged that the motors may be started in turn in any desired order, by first connecting the terminals of the motor to be started to different points of the auto- transformer windings, and then connecting said motor terminals to the line directly.

In another aspect my invention consists of a motor control system comprising a plurality of motors, a starting controller, means for connecting each motor to the line directly and to the starting controller, and interlocking mechanism for preventing the starting controller, unless it is in "off" position, from being connected to any of the motors.

In still another aspect my invention consists of a motor control system comprising two motors, a starting controller therefor, a switch for each motor for directly connecting it to the line, a switch for connecting either motor to the starting controller, and interlocking mechanism for preventing movement of the starting controller if either motor is connected directly to the line by its switch and is also connected to the starting controller, but allowing any switch to be opened at any time.

From another point of view my invention comprises an induction motor, auto-transformer windings, a controller for successively connecting the motor to points of different potential on said transformer windings, and an adjustable inductive resistance arranged to be momentarily connected across each section of the auto-transformer winding as it is cut into or out of the motor circuit.

From still another point of view my invention comprises an electric motor, and a controller therefor having a plurality of drums, one of said drums being arranged to vary the potential impressed on the motor, and another of said drums being arranged to first connect the motor to the potential varying drum and then directly to the line.

In another aspect my invention comprises a casing, a drum rotatable on a vertical axis, contact fingers coöperating therewith, conductors leading from said fingers around the inside of the controller casing, and vertical conductors connected to said first mentioned conductors and extending through insulators in the top of the controller casing.

Other features of my invention will appear from the description and drawings and will be particularly pointed out in the claims.

Figure 1 shows the preferred embodiment of my invention as applied to a three-phase system of motor control. Fig. 2 shows the electrical connections of the various parts of the system shown in Fig. 1. Fig. 3 shows the scheme of the interlocks. Fig. 3ª shows a section through the disk 36 and slide 50. Fig. 4 shows an elevation of the controller proper, the oil tank being partly lowered. Fig. 5 shows a plan view of the controller proper. Fig. 6 is a section on the line 6—6 of Fig. 4 with the upper supporting ring of the controller removed. Fig. 7 is a section on the line 7—7 of Fig. 4; and Fig. 8 is a diagram similar to Fig. 2 showing the controller applied to a two-phase system.

The motors 1 and 2, which are here shown as induction motors though obviously for some features of my invention other kinds of motors may be used, may be connected directly to the line by oil switches 3 and 4 respectively, operated by handles 5 and 6 respectively, or either motor may be connected to the controller 7 by the double-throw oil switch 8, operable by the handle 9. The controller 7 may be connected to the line by an oil switch 10.

The controller 7 consists of three drums 11, 12 and 13, all operable by a single wheel or handle 14. The wheel 14 is fastened on the shaft 15 and drives the drum 13 through the worm gear 16—16ª, as best shown in Fig. 5. The drum 12 is geared to the drum 13 by means of the gear wheels 17 and 18, as best shown in Fig. 7, and rotates simultaneously therewith at the same speed but in the opposite direction. The drum 13 when rotated drives the drum 11 by means of the gear wheels 19 and 20, these two gear wheels being of the same diameter, but gear 19 having half of its teeth cut away, as shown best in Fig. 6, so that the drum 11 rotates with the drum 13 for half a rotation and remains stationary during the next half rotation of the drum 13. Integral or otherwise attached to the gear wheels 19 and 20 are notched disks 21 and 22 respectively, which with the swinging arm 23 form an interlock to prevent movement of drum 11 save when the teeth of gears 19 and 20 are in mesh and also to advance the drum 11 slightly farther than driven by the gears 19 and 20 in order to provide clearance upon the return of these gears to mesh.

In Fig. 5 the relation of the driving parts is shown with the controller in "off" position, while in Fig. 6 their relation is shown when the controller is in operating position 4, (Fig. 2). When the controller is turned forward by the wheel 14, all three of the drums commence to move and continue to do so until position 2 is reached, when the teeth of the segmental gear 19 pass out of mesh with those of gear 20, and arm 23 is swung by the cam surface on disk 21 into one of the notches in disk 22 to lock said disk and the drum 11 against further movement. This continues to be the state of affairs until position 6 is reached. Then the teeth of gear 19 again engage with those of gear 20, and the end of arm 23 is moved by the cam-like side of the notch in disk 22 out of said notch and into the cut away portion of disk 21. Thus the drum 11 begins to rotate again. The drum 11 therefore stands still while the controller moves between positions 2 and 6, while for each complete rotation of the drums 12 and 13 it rotates through 180°. Should the controller be turned backward from any position from which such movement is permitted, the operation is the reverse of that just described.

The drum 11 is divided into two similar halves 11ª and 11ᵇ as shown in Fig. 2. There are two sets of contact fingers 24 and 25 for the drum 11, these two sets being diametrically opposite. Each half of the drum coöperates with each set of contact fingers during alternate full operations of the controller. Coöperating with the drums 12 and 13 are sets of contact fingers 26 and 27, the lower six of these two sets of contact fingers being connected to different taps of the two inductive resistances or auto-transformer windings 28 and 29. The seventh from the bottom of each of these two sets is connected to one of the blades of switch 8, while the uppermost fingers of the sets are connected to adjustable taps on preventive inductive resistances or reactances 30 and 31 respectively. The drums 12 and 13 each have an upper row of contact segments, 26ª and 27ª respectively. The segments of these rows are all in the same plane transverse to the axis of the drums, and are staggered with respect to the other contacts of their drums. By these segments the preventive resistances 30 and 31 are momentarily connected across the different sections of the auto-transformer windings as they are cut into or out of the motor circuit. The structure of the drums will be seen from a mere inspection of the drawings and will not be now further described. The auto-transformer windings 28 and 29 are immersed in oil in a separate oil tank, as shown in Fig. 1, and are connected to the controller by cables 62ª.

On the shaft 15 is a sleeve 32, this sleeve being driven from the shaft 15 by means of a back gear 33. The ratio of speed reduction between the shaft 15 and sleeve 32 is the same as that between the shaft 15 and drum 13, so that the sleeve 32 rotates at the same speed as the controller. This ratio is here shown as an 8 to 1 reduction so that for each revolution of the wheel 14 the controller moves one step. Mounted upon the sleeve 32, as shown in Fig. 4, or geared to rotate at the same speed therewith and in the same direction, as shown in Fig. 3, is an indicator 34 to show the position of the controller. Mounted upon the sleeve 32 as shown in Fig. 3, though omitted from Fig. 4 for the sake of simplicity, are three disks 35, 36, and 37 respectively. Upon the disk 36 are two teeth of a ratchet wheel with which a pawl 38 cooperates to prevent backward movement of the controller from either the "off" or the "full on" position. From any other position the controller may be moved either backward or forward, but from these two positions forward movement only is permitted. In Fig. 3 the position of the sleeve 32 is shown with the controller in "off" position. The other positions are indicated on disk 35.

The handles 5, 6 and 9 are connected not only to the switches which they operate but also by rods 39, 40 and 41 to the interlocking mechanism. In Fig. 3 the rods 39, 40 and 41 are omitted for the sake of simplicity, the handles 5, 6 and 9 being connected directly to the interlocking mechanism. Handle 9 may be moved in either direction depending on which motor is to be connected to the controller by switch 8. By movement of the handle 9 the half disk 42 is rotated about its axis 43 into the path of slide 44 or 45, these slides being respectively connected to the handles 5 and 6. The movement of handle 9 from "off" position can only take place when the controller is in "off" position and the slot 46 in ring 47 on disk 36 is immediately over the spring latch 49 in slide 50, the slide 50 carrying a roller 78 upon which the cam surface of groove 79 in sector 77 acts to move the slide upwards when handle 9 is moved in either direction from its central position. With the controller in any other position it is impossible to close switch 8 because the path of latch 49 is blocked by ring 47. Although the handle of the switch 8 cannot be closed in either direction unless the controller is in "off" position, by reason of the shape of latch 49 and ring 47 it can be opened at any time, whatever the position of the controller. If the switch handle 9 is moved to connect the controller to either motor, the switch which connects that motor directly to the line cannot be closed unless the controller is in position 7, its "full on" position. Suppose that motor 1 is connected to the controller. If it is attempted to close switch 3 it will be found impossible to do so, because the half disk 42 is in the path of slide 44 and the disk 35 on sleeve 32 is in the path of slide 51. This slide 51 is pressed downward by a spring 52. When the controller has been moved into position 7, switch 3 can be closed by compressing the spring 52 and moving the slide 51 into the notch 53 in disk 35. The controller is now locked against all movement either forward or backward. If the handle 9 be now moved into its middle position, the spring 52, expanding, pushes slide 51 downwards, and slide 44 along the upper edge of half disk 42, thus unlocking the controller for forward movement but locking the handle 9 from movement to connect the motor 1 to the controller. Handle 9 is also locked by ring 47 against any movement until the controller is moved into "off" position. If the switch 8 is closed to connect motor 2 to the controller, a similar interlocking takes place as before, the parts 45, 54, 55 and 56 corresponding respectively to the parts 44, 51, 52 and 53 above described in connection with motor 1. Thus the interlocking which takes effect may be summarized as follows:—

1st. Switch 8 cannot be moved from "off" or central position to connect either motor to the controller unless the controller is in "off" position.

2nd. Switch 3 cannot be closed when switch 8 connects motor 1 to the controller except when the controller is in position 7, its "full on" position.

3rd. Switch 4 cannot be closed when switch 8 connects motor 2 to the controller except when the controller is in position 7, its "full on" position.

4th. The controller cannot move at all when either motor is connected both to the controller through switch 8 and to the line through switch 3 or 4, this condition, however, only being possible when the controller is in position 7, its "full on" position.

5th. The switches 3, 4 and 8 may be opened at any time.

6th. Switch 3 may be closed at any time when motor 1 is not connected to the controller by switch 8.

7th. Switch 4 may be closed at any time when motor 2 is not connected to the controller by switch 8.

8th. Switch 8 cannot be closed to connect motor 1 to the controller when switch 3 is closed.

9th. Switch 8 cannot be closed to connect motor 2 to the controller when switch 4 is closed.

10th. The controller can be moved only in a forward direction from position 0, its "off" position, and from position 7, its "full on" position. From all other positions it can be moved freely in either direction.

11th. Both motors cannot be connected to the controller at once.

In Fig. 4, a lower ring 7$^b$ is shown mounted upon walls 7$^c$ of a pit. An upper ring 7$^a$ is supported over the lower ring 7$^b$ by rods 57. The whole of controller 7 is suspended from ring 7$^a$ over the pit. Into this pit the tank 58 containing oil in which the three controller drums are normally immersed, can be lowered by means of the hoists 59 and 60 in order to allow inspection and repair. In Fig. 4 the tank is shown partly lowered. The sets of contact fingers 24, 25, 26 and 27 are connected to arc-shaped conducting bars 61 of various lengths, which pass around inside of the oil tank 58 to the proper vertical conducting rods 62. These rods 62 are connected to the bars 61 by nuts 61$^a$ as shown, and extend to the top of the controller and through the insulating ring 7$^d$, ending in connectors 63 just beneath the openings through the insulating bushings 64 in ring 7$^a$. The ring 7$^d$ serves to support the rods 62 and to space apart their upper ends. Cables 62$^a$ are soldered to the other parts of the connectors at the upper ends of the bars 62 and, passing through the bushings 64, lead some to the mains 54, 55 and 56, some to the switch blades 8, and some to the transformer windings 28 and 29, which transformer windings, as shown in Fig. 1, are immersed in oil in the usual oil tank.

The operation of the system is as follows:— Either motor may be started first. Suppose it is desired to start motor 1 first. The switches 3 and 4 should both be open, the controller in its "off" position and switch 10 closed. If switch 3 is closed the switch 8 cannot be closed to connect motor 1 to the controller. However, switch 3 being open, the handle 9 is moved to connect motor 1 to the controller 7. This moves half disk 42 and sector 77, the latter operating a slide 50. It is now impossible to close switch 3. The wheel 14 is now given one full rotation, moving the controller into position 1. The drum 11 now connects the mains 55 and 56 to the terminals of the inductive resistance or auto-transformer winding 28 and the mains 54 and 55 to the terminals of the auto-transformer winding 29. These two auto-transformer windings are therefore V-connected, the main 55 being connected to the middle of the V. The middle switch blade of switch 8 is also connected to the middle of this V while the two outside blades are connected by the drums 12 and 13 respectively to the two taps on the legs of the V nearest the center thereof. This supplies a low voltage to motor 1 and generally causes it to start. In case the load on the motor is too great for it to start with the controller in position 1, the latter is moved into position 2, and so on until the motor does start. When the motor starts the controller is left in the successful starting position until practically the full speed is attained, when the controller is moved rapidly into the position 7, its "full on" position. As the controller is moved between any two adjacent positions between operative positions 1 and 6, the preventive inductive resistances 30 and 31 are momentarily connected across those sections of the auto-transformer windings 28 and 29 respectively which are being cut into or out of the motor circuit. Hence no section of the auto-transformer windings is ever short-circuited, the increase or decrease of potential impressed on the motor is more gradual, and the motor circuit is not broken during the operation of the controller. Sparking at the controller contacts is thus largely avoided.

When the controller is moved from position 2 to position 3, the teeth of gear wheel 19 pass out of engagement with those of gear wheel 20, and the arm 23 is swung into one of the notches of disk 22 and locks drum 11 against further movement. When the controller reaches position 6, the motor is connected across the outside terminals of the inductive resistances 28 and 29. In passing from position 6 to position 7, the arm 23 unlocks the drum 11 and allows the teeth of wheel 19, which at position 6 again mesh with the teeth of wheel 20, to again move the drum 11. The drum 11 then connects the three terminals of motor 1 directly to the three mains 54, 55 and 56 and disconnects the drums 12 and 13 and the auto-transformer windings 28 and 29. The movement of the controller from position 6 to position 7 does not vary the potential impressed upon the motor. The controller, now being in position 7, cannot be moved backward, but if desired may be moved forward to break the circuits and allow the motor to stop. However, unless it is desired to immediately stop the motor the switch 3 should be closed by operating the handle 5, thus forcing slide 51 into notch 53 in disk 35. Until this time the switch 3 could not be closed. The controller is now locked against movement in either direction. The handle 9 should now be moved to its central position to open switch 8, and disconnect the motor 1 from the controller 7. This handle, when it has reached its middle position, cannot be moved in either direction therefrom, as the controller is not in "off" position and the closing movement of switch 8 is prohibited because the ring 47 is in the path of latch 49 (Figs. 3 and 3$^a$). As the handle 9 is moved into its middle position, the spring 52, expanding, moves slide 51 out of notch 53 and slide 44 along the upper edge of half disk 42, thus unlocking the controller for forward movement and locking the switch 8 against movement to connect motor 1 to the controller. The motor 1 is now connected for normal running. The controller can now be moved forward from position 7 to its "off" position. A corresponding series of operations in connection with motor 2 may now be gone through with as above described in connection with motor 1, using switch 4 instead of switch 3, and switch 8 in the other direction. Either motor may be stopped when normally running, by opening the switch 3 or 4 as the case may be.

The connections shown in the diagram of Fig. 2 are suitable without any change for a two-phase system in which one of the mains is common to the two phases. In such case all that would have to be done would be to substitute two-phase motors for the three-phase motors 1 and 2 shown. The main 55 would be the one common to the two phases.

My controller is equally applicable to those two-phase systems in which the two phases have entirely separate and distinct circuits, but in such a case the connections must be varied slightly. These variations are shown in Fig. 8, where instead of a common return main 55 for the two phases there are two return mains 55<sup>a</sup> and 55<sup>b</sup>, one for each phase. The switches 3<sup>a</sup>, 4<sup>a</sup>, 8<sup>a</sup> and 10<sup>a</sup> each have four blades instead of three. Instead of being connected together and connected through a common blade of the switch 10 to the common return main 55, the two upper contacts of the sets of contacts 24 and 25 are connected through separate blades of the switch 10<sup>a</sup> to the two return mains 55<sup>b</sup> and 55<sup>a</sup> respectively. A similar modification appears in the connections of the lower contacts of these two sets of contacts which instead of being connected in common to the middle blade of switch 8 are connected to independent blades of switch 8<sup>a</sup>. With these modifications that half of the drum 11 which co-operates with the contacts 24 controls the connections of the mains 55<sup>b</sup> and 56 to the drum 12 and the windings of one phase of the motor to be controlled, while the other half of drum 11 controls the connections of the mains 54 and 55<sup>a</sup> to the drum 13 and the windings of the other phase of said motor. The motors are here shown as two phase motors 1<sup>a</sup> and 2<sup>a</sup> in place of the three-phase motors, shown in the other figures. Otherwise the system shown in Fig. 8 is exactly like that shown in Fig. 2, and the operation of the controller when connected in either way is precisely the same.

When the controller is connected for either two or three-phase systems the wires 65 and 66 are in circuit only when the controller is in its "full on" position. Therefore if desired, overload devices may be placed in these wires in order to protect the motor from too great a current. These overload devices are especially useful in case the controller is used to start but one motor, and the controller is left in position 7 as a running position. It is also useful as an auxiliary safety device in connection with the system as shown where a plurality of motors are controlled, as it might easily happen either that the attendant might leave the controller in position 7 without closing the proper switch for connecting the motor directly to the line, or having closed said switch might neglect to move the controller to "off" position. When connected in this manner these overload devices allow the temporary heavy starting current which is necessary especially when the motor is starting under load, but prohibit any such heavy flow of current after the motor has reached full speed and the controller is in its "full on" position. These overload devices may take the form either of fuses 67 and 68 as shown in Fig. 8 or of magnetic relays 69 and 70 as shown in Fig. 2. These relays are shown as controlling a local circuit from the battery 71 to energize the solenoid 72 to trip the switch 10, but obviously the solenoids of the relays might directly trip the switch 10 if desired, the local circuit from the battery 71 being in such case omitted. It is also advisable to have overload devices for tripping the switches 3 and 4 respectively. These overload devices may be as shown in Fig. 2, where the switches 3 and 4 are shown biased to "off" position but arranged to be latched when closed until opened by their handles 5 or 6 or until the current in the solenoids 73 or 74 rises beyond a predetermined limit, these solenoids being supplied through series transformers 75 and 76. These solenoids may be responsive to the current in either one or any number of the supply mains.

It is obvious that there may be as many motors as desired under the control of the single controller 7, the switch 8 having a corresponding number of operative positions.

I have described my invention in what I now consider to be its preferred form but it is obvious that some features of my invention may be used without others, and that various equivalents may be substituted for some of the parts particularly shown and described. All of these obvious omissions and substitutions I intend to cover in the following claims.

What I claim as new is:—

1. A motor control system, comprising two motors, a single controller, and connections whereby said controller can control either of said motors separately but is prevented from controlling them both together and can leave one motor running while it controls the other.

2. A motor control system, comprising a plurality of motors, a single starting controller, and connections whereby said controller can be used to start said motors successively in any order without requiring any motor to be stopped in order to start another, but is prevented from starting them simultaneously.

3. A motor control system comprising a plurality of motors, a single starting controller, and connections and switches so arranged that said controller may start said motors separately and bring them to and leave them at full speed in any desired order, but is prevented from starting all the motors at once.

4. A motor control system, comprising a plurality of motors, and a single starting controller so connected and arranged that any one of the motors may be started and brought up to full speed by a certain movement, and the controller then left free to start another motor by a repetition of the same movement while the first motor remains at full speed.

5. A motor control system comprising a plurality of alternating current motors, and a single starting controller so connected and arranged that a predetermined movement thereof may be used to start any one of the motors and bring it up to full speed, and the controller then left free to start another motor while the first motor remains at full speed.

6. A motor control system comprising a plurality of induction motors, and a single starting controller connected and arranged to vary the voltage in the primary circuit of any of the motors, but to do so only independently of any other motor.

7. A motor control system comprising a plurality of induction motors, and a single starting controller so connected and arranged that it may start any of the motors only separately by varying the voltage in the primary circuit thereof, and then be left free to start any other motor while the first motor continues at full speed.

8. A motor control system comprising a plurality of induction motors, a potential starting controller, and connections and switches so arranged that said motors may be separately started by said controller in any desired order, but are prevented from being started simultaneously.

9. In combination, a plurality of induction motors, auto-transformer windings, and a controller so connected and arranged that the motors may be started in turn in any desired order, by first connecting each terminal of the motor to be started successively to different points of the auto-transformer windings and then connecting said motor terminal to the line directly.

10. A motor control system comprising a plurality of motors, a starting controller, a switch for each motor for directly connecting it to the line, and a switch for connecting any motor to the starting controller.

11. A motor control system comprising a plurality of motors, a starting controller, a switch for each motor for directly connecting it to the line, a switch for connecting any motor to the starting controller, and devices for tripping any of said first mentioned switches when the current therethrough rises above a predetermined limit.

12. A motor control system comprising a plurality of motors, a starting controller, and means for connecting each motor to the line directly and to the starting controller, but to the latter only one at a time.

13. A motor control system comprising a plurality of motors, a starting controller, means for connecting each motor to the line directly and to the starting controller, but to the latter only one at a time, and means for connecting the starting controller to the line.

14. A motor control system comprising a plurality of motors, a starting controller, means for connecting each motor to the line directly and to the starting controller, means for connecting the starting controller to the line, and an overload device for said last mentioned means operable only when the controller is in "full on" position.

15. A motor control system comprising a plurality of motors, a starting controller, a switch for each motor for directly connecting it to the line, a switch for connecting any motor to the starting controller, and a switch for connecting said starting controller to the line.

16. A motor control system comprising a plurality of motors, a starting controller, a switch for each motor for directly connecting it to the line, a switch for connecting any motor to the starting controller, a switch for connecting said starting controller to the line, and overload tripping means for said last mentioned switch.

17. A motor control system comprising a plurality of motors, a starting controller, a switch for each motor for directly connecting it to the line, a switch for connecting any motor to the starting controller, a switch for connecting said starting controller to the line, and overload tripping means for said last mentioned switch, operable only when the controller is in "full on" position.

18. A motor control system comprising a plurality of motors, a starting controller, a switch for each motor for directly connecting it to the line, a switch for connecting any motor to the starting controller, a switch for connecting said starting controller to the line, and overload tripping means for said first and said last mentioned switches.

19. A motor control system comprising a plurality of motors, a starting controller, a switch for each motor for directly connecting it to the line, a switch for connecting any motor to the starting controller, a switch for connecting said starting controller to the line, and an overload tripping device for each of said first mentioned switches and for said last mentioned switch, the tripping device for said last mentioned switch being operable only when the controller is in "full on" position.

20. A motor control system comprising a plurality of motors, a starting controller, a switch for connecting each motor directly to the line, a switch for connecting any motor to the starting controller, and interlocking mechanism for preventing the closure of the switch for directly connecting a motor to the line when that motor is connected to the starting controller and the controller is in other than the "full on" position.

21. A motor control system comprising a plurality of motors, a starting controller, means for connecting each motor to the line directly and to the starting controller, and interlocking mechanism for preventing the starting controller, unless it is in "off" position, from being connected to any of the motors.

22. A motor control system comprising a plurality of motors, a starting controller, a switch for each motor for directly connecting it to the line, a switch for connecting any motor to the starting controller, and interlocking mechanism for preventing movement of the starting controller if any motor is connected directly to the line by its switch and is also connected to the starting controller.

23. A motor control system comprising a plurality of motors, a starting controller, a switch for connecting each motor directly to the line, a switch for connecting any motor to the starting controller, and interlocking mechanism for preventing the closure of the switch for directly connecting a motor to the line when that motor is connected to the starting controller and the controller is in other than "full on" position, but allowing any switch to be opened at any time.

24. A motor control system comprising a plurality of motors, a starting controller, a switch for each motor for directly connecting it to the line, a switch for connecting any motor to the starting controller, and interlocking mechanism for preventing movement of the starting controller if any motor is connected directly to the line by its switch and is also connected to the starting controller, but allowing any switch to be opened at any time.

25. A motor control system comprising a plurality of motors, a starting controller, a switch for connecting each motor directly to the line, a switch for connecting any motor to the starting controller, and interlocking mechanism for preventing the closure of the switch for directly connecting a motor to the line when that motor is connected to the starting controller and the controller is in other than "full on" position, but allowing any such switch to be closed whenever its motor is not connected to the starting controller.

26. A motor control system comprising a plurality of motors, a starting controller, a switch for connecting each motor directly to the line, a switch for connecting any motor to the starting controller, and interlocking mechanism for preventing the closure of the switch for directly connecting a motor to the line when that motor is connected to the starting controller and the controller is in other than "full on" position, but allowing any such switch to be closed whenever its motor is not connected to the starting controller and allowing any switch to be opened at any time.

27. A motor control system comprising a plurality of motors, a starting controller, means for connecting each motor to the line directly and to the starting controller, and interlocking mechanism for preventing any motor from being connected to the starting controller when connected to the line directly.

28. A motor control system comprising a plurality of motors, a starting controller, means for connecting each motor to the line directly and to the starting controller, and ratchet mechanism for preventing the starting controller from being moved backward from either "off" or "full on" position.

29. A motor control system comprising two motors, a starting controller, and means for connecting each motor to the line directly and to the starting controller, but to the latter only one at a time.

30. A motor control system comprising two motors, a starting controller, means for connecting each motor to the line directly and to the starting controller, and interlocking mechanism for preventing either motor from being connected to the starting controller unless the latter is in "off" position.

31. A motor control system comprising two motors, a starting controller, a switch for each motor for directly connecting it to the line, and a switch for connecting either motor to the starting controller.

32. A motor control system comprising two motors, a starting controller, a switch for each motor for directly connecting it to the line, a switch for connecting either motor to the starting controller, and interlocking mechanism for preventing movement of the starting controller if either motor is connected directly to the line by its switch and is also connected to the starting controller.

33. A motor control system comprising two motors, a starting controller, a switch for each motor for directly connecting it to the line, a switch for connecting either motor to the starting controller, and interlocking mechanism for preventing the closure of the switch for directly connecting a motor to the line when that motor is connected to the starting controller and the controller is in other than "full on" position.

34. A motor control system comprising two motors, a starting controller, a switch for each motor for directly connecting it to the line, a switch for connecting either motor to the starting controller, and interlocking mechanism for preventing movement of the starting controller if either motor is connected directly to the line by its switch and is also connected to the starting controller, but allowing any switch to be opened at any time.

35. A motor control system comprising two motors, a starting controller, a switch for each motor for directly connecting it to the line, a switch for connecting either motor to the starting controller, and interlocking mechanism for preventing the closure of a switch for directly connecting the motor to the line when that motor is connected to the starting controller and the controller is in other than "full on" position, but allowing any switch to be opened at any time.

36. A motor control system comprising two motors, a starting controller, a switch for each motor for directly connecting it to the line, a switch for connecting either motor to the starting controller, and interlocking mechanism for preventing either motor from being connected to the starting controller when connected to the line directly.

37. A motor control system comprising two motors, a starting controller, a switch for each motor for directly connecting it to the line, a switch for connecting either motor to the starting controller, and interlocking mechanism for preventing either motor from being connected to the starting controller when connected to the line directly, but allowing any switch to be opened at any time.

38. In combination, an induction motor, auto-transformer windings, a controller for successively connecting the motor to points of different potential on said auto-transformer windings to vary the speed of the motor, and an adjustable reactance arranged to be connected in circuit when the controller is moved to prevent short-circuiting of any part of the auto-transformer windings.

39. In combination, an induction motor, auto-transformer windings, a controller for successively connecting the motor to points of different potential on said auto-transformer windings to vary the speed of the motor, an adjustable choke coil arranged to be connected in circuit when the controller is moved to prevent short-circuiting of any part of the auto-transformer windings, and a device, operable only when the controller is in "full on" position, arranged to open the circuit if an overload on the motor occurs.

40. In combination, an induction motor, auto-transformer windings, a controller for successively connecting the motor to points of different potential on said auto-transformer windings, and an adjustable inductive resistance arranged to be momentarily connected across the terminals of each section of the auto-transformer windings as it is cut into the motor circuit.

41. In combination, an induction motor, auto-transformer windings, a controller for successively connecting the motor to points of different potential on said auto-transformer windings, and an adjustable inductive resistance arranged to be momentarily connected across the terminals of each section of the auto-transformer windings as it is cut into or out of the motor circuit.

42. In combination, an induction motor, auto-transformer windings, a controller for successively connecting the motor to points of different potential on said auto-transformer windings, and an adjustable reactance arranged to be momentarily connected across the terminals of each section of the auto-transformer windings as it is cut into the motor circuit and to be later short-circuited.

43. In combination, an induction motor, auto-transformer windings, a drum controller for connecting the motor to different taps on said auto-transformer windings, a preventive resistance, and a row of contact segments arranged around said drum to engage with the same contact finger to connect said preventive resistance in circuit as the motor connections are being changed from one tap to another.

44. In combination, an induction motor, auto-transformer windings, a drum controller for connecting the motor to different taps on said auto-transformer windings, a preventive inductive resistance, and a ring of contacts arranged around the drum to successively engage with the same contact finger to momentarily connect the preventive inductive resistance across the section of the auto-transformer windings which is about to be cut into or out of the motor circuit.

45. In combination, an electric motor, and a controller therefor having a plurality of drums, one of said drums being arranged to vary the potential impressed on the motor, and another of said drums being arranged to first connect the motor to the potential-varying drum and then directly to the line.

46. In combination, an electric motor, and a controller therefor having a plurality of drums, one of said drums being arranged to vary the potential impressed on the motor, and another of said drums being arranged to first connect the motor to the potential-varying drum and then to disconnect it from the potential-varying drum and connect it directly to the line.

47. In combination, an electric motor, a controller therefor having a plurality of drums, one of said drums being arranged to vary the potential impressed on the motor, and another of said drums being arranged to first connect the motor to the potential-varying drum and then to disconnect it from the potential-varying drum and connect it directly to the line, and an overload device operable only when said latter drum is in its last mentioned position.

48. In combination, an induction motor, auto-transformer windings, and a controller having a plurality of drums, one of said drums being arranged to successively connect the motor to points of different potential on said auto-transformer windings, and another of said drums being so arranged that in one of its positions it connects the motor to the first drum to be controlled thereby and in another position connects the motor directly to the line.

49. In combination, an induction motor, auto-transformer windings, and a controller having a plurality of drums, one of said drums being arranged to successively connect the motor to points of different potential on said auto-transformer windings, and another of said drums being arranged so that in one of its positions it connects the motor to the first drum to be controlled thereby and in another position connects the motor directly to the line and disconnects said first drum and the auto-transformer windings.

50. In combination, a polyphase motor, two auto-transformer windings, and a controller comprising a plurality of drums, two of said drums being arranged respectively to connect two of the motor terminals to different taps on the two auto-transformer windings, and another of said drums being so arranged that in one of its positions it connects the motor terminals to the first two of said drums to allow the motor to be controlled thereby and in another position connects all the motor terminals directly to the line.

51. In combination, a three-phase motor, V-connected auto-transformer windings, and a controller having a plurality of drums, two of said drums being arranged respectively to successively connect two of the motor terminals to different points on the two legs of the auto-transformer windings, and another of said drums being so arranged that in one of its positions it connects the motor terminals to the first two of said drums to allow the motor to be controlled thereby and in another position connects the motor terminals directly to the line.

52. In combination, a three-phase motor, V-connected auto-transformer windings, and a controller having a plurality of drums, two of said drums being arranged respectively to successively connect two of the motor terminals to different points on the two legs of the auto-transformer windings, and another of said drums being so arranged that in one of its positions it connects the motor terminals to the first two of said drums to allow the motor to be controlled thereby and in another position connects the motor terminals directly to the line and disconnects the first two drums and the auto-transformer windings from the motors.

53. In combination, an alternating current motor, a source of current supply, an inductive resistance, and a controller comprising a plurality of drums operable by the motion of a single handle, one of said drums in one of its positions connecting the terminals of the inductive resistance and one motor terminal to the line and a second motor terminal to a second drum, and said second drum connecting said second motor terminal to different points on said inductive resistance.

54. In combination, an alternating current motor, a source of current supply, an inductive resistance, and a controller comprising a plurality of drums operable by the motion of a single handle, one of said drums in one of its positions connecting the terminals of the inductive resistance and one motor terminal to the line and a second motor terminal to a second drum, and said second drum connecting said second motor terminal to different points on said inductive resistance, said first drum in another position disconnecting said inductive resistance and second drum from the source of supply.

55. In combination, an alternating current motor, a source of current supply, an inductive resistance, and a controller comprising a plurality of drums operable by the motion of a single handle, one of said drums in one of its positions connecting the terminals of the inductive resistance and one motor terminal to the line and a second motor terminal to a second drum, and said second drum connecting said second motor terminal to different points on said inductive resistance, said first drum in another position connecting all the motor terminals directly to the line.

56. In combination, an alternating current motor, a source of current supply, an inductive resistance, and a controller comprising a plurality of drums operable by the motion of a single handle, one of said drums in one of its positions connecting the terminals of the inductive resistance and one motor terminal to the line and a second motor terminal to a second drum, and said second drum connecting said second motor terminal to different points on said inductive resistance, said first drum in another position connecting all the motor terminals directly to the line and disconnecting said inductive resistance and said second drum from the source of supply.

57. In combination, a three-phase induction motor, a three-phase source of supply, two auto-transformer windings, and a controller comprising three drums operable by the motion of a single handle, one of said drums in one of its positions connecting each of said auto-transformer windings between two of the mains from the source of supply, one motor terminal to the main common to the two auto-transformer windings, and the other two motor terminals to the two other drums respectively.

58. In combination, a three-phase induction motor, a three-phase source of supply, two auto-transformer windings, and a controller comprising three drums operable by a single handle, one of said drums in one of its positions connecting each of said auto-transformer windings between two of the mains from the source of supply, one motor terminal to the main common to the two auto-transformer windings, and the other two motor terminals to the two other drums respectively, said two other drums each connecting its motor terminal to different taps from one of the auto-transformer windings.

59. In combination, a three-phase induction motor, a three-phase source of supply, two inductive resistances, and a controller comprising three drums operable by the motion of a single handle, one of said drums in one of its positions connecting each of said inductive resistances between two of the mains from the source of supply, one motor terminal to the main common to the two inductive resistances, and the other two motor terminals to the two other drums respectively, and in another position connecting all the motor terminals directly to the mains.

60. In combination, a three-phase induction motor, a three-phase source of supply, two inductive resistances, and a controller comprising three drums operable by the motion of a single handle, one of said drums in one of its positions connecting each of said inductive resistances between two of the mains from the source of supply, one motor terminal to the main common to the two inductive resistances, and the other two motor terminals to the two other drums respectively, said two other drums each connecting its motor terminal to different points on one of the inductive resistances, said first drum in another position connecting all the motor terminals directly to the mains.

61. In combination, a three-phase induction motor, a three-phase source of supply, two auto-transformer windings, and a controller comprising three drums operable by the motion of a single handle, one of said drums in one of its positions connecting each of said auto-transformer windings between two of the mains from the source of supply, one motor terminal to the main common to the two auto-transformer windings, and the other two motor terminals to the two other drums respectively, and in another position connecting all the motor terminals directly to the mains and disconnecting said other drums and the auto-transformer windings from the source of supply.

62. In combination, a three-phase induction motor, a three-phase source of supply, two inductive resistances, and a controller comprising three drums operable by the motion of a single handle, one of said drums in one of its positions connecting each of said inductive resistances between two of the mains from the source of supply, one motor terminal to the main common to the two inductive resistances, and the other two motor terminals to the two other drums respectively, said two other drums each connecting its motor terminal to different points on one of the inductive resistances, said first drum in another position connecting all the motor terminals directly to the mains and disconnecting said other drums and the inductive resistances from the source of supply.

63. In a controller the combination of a plurality of drums, a segmental gear and cam rigidly mounted on one of the drums, a swinging arm, and a gear and notch plate rigidly mounted on another of the drums, said gears, cam, notch-plate and arm coöperating to move and lock one of the drums intermittently at predetermined times.

64. In an intermittent gear, a toothed segment, a cam thereon, a toothed wheel to engage with the toothed segment with a flange having a notch or notches in its periphery, and a movable member engaging with the cam and notches to move and lock the toothed wheel.

65. In combination, an electric motor, a controller therefor comprising a plurality of drums, one of said drums being arranged to vary the potential impressed on said motor, another of said drums being arranged in one of its positions to connect the motor to the potential-varying drum and in another position to connect the motor directly to the line, a handle arranged to operate said first drum, and an intermittent gear between the two drums.

66. In combination, an electric motor, a controller therefor comprising a plurality of drums, one of said drums being arranged to vary the potential impressed on said motor, another of said drums being arranged in one of its positions to connect the motor to the potential-varying drum and in another position to connect the motor directly to the line and disconnect it from the potential-varying drum, a handle arranged to operate one of said drums, and an intermittent gear between the two drums.

67. In combination, an electric motor, a controller therefor comprising a plurality of drums, one of said drums being arranged to vary the potential impressed on said motor, another of said drums being arranged in one of its positions to connect the motor to the potential-varying drum and in another position to connect the motor directly to the line, a handle arranged to operate one of said drums, and an intermittent gear between the two drums whereby the said second drum after reaching its first position remains stationary until the full potential has been impressed upon the motor.

68. In combination, an electric motor, a controller therefor comprising a plurality of drums, one of said drums being arranged to vary the potential impressed on said motor, another of said drums being arranged in one of its positions to connect the motor to the potential varying drum and in another position to connect the motor directly to the line and disconnect it from the potential varying drum, a handle arranged to operate said first drum, and an intermittent gear between the two drums whereby said second drum remains stationary after reaching its first position until the full potential has been impressed upon the motor.

69. In a controller, a casing, a rotatable drum in said casing, contact-fingers coöperating therewith, arc-shaped bars leading from the fingers around the inside of the controller casing, and rods connected to the other ends of said arc-shaped bars and extending to the top of the controller casing.

70. In a controller, a casing, a rotatable drum in said casing, contact-fingers coöperating therewith, arc-shaped bars leading from the fingers around the inside of the controller casing, and conductors connected to the other ends of said arc-shaped bars and extending through the top of the controller casing.

71. In a controller, a casing, a rotatable drum in said casing, contact-fingers coöperating therewith, arc-shaped bars leading from the fingers around the inside of the controller casing, and circumferentially arranged rods connected to the other ends of said arc-shaped bars and extending to the top of the controller casing 72. In a controller, a casing, a rotatable drum in said casing, contact-fingers coöperating therewith, arc-shaped bars leading from the fingers around the inside of the controller casing, and rods spaced apart which are connected to the other ends of said arc-shaped bars and extend to the top of the controller casing.

73. In a controller, a casing, a rotatable drum in said casing, contact-fingers coöperating therewith, arc-shaped bars leading from the fingers around the inside of the controller casing, rods connected to the other ends of said arc-shaped bars and extending to the top of the controller casing, and an insulating ring arranged to space said rods apart.

74. In a controller, a casing, a rotatable drum in said casing, contact-fingers coöperating therewith, arc-shaped bars leading from the fingers around the inside of the controller casing, rods connected to the other ends of said arc-shaped bars and extending to the top of the controller casing, and an insulating ring arranged to support said rods and to space apart their upper ends.

75. In a controller, a casing, a rotatable drum in said casing, contact-fingers coöperating therewith, arc-shaped bars leading from the fingers around the inside of the controller casing, and rods connected to the other ends of said arc-shaped bars and extending to the top of the controller casing, the controller casing being removable and containing oil in which the controller contacts are immersed.

76. In a controller, a casing, a drum rotatable on a vertical axis, contact fingers coöperating therewith, conductors leading from said fingers around the inside of the controller casing, and vertical conductors attached to said first mentioned conductors and extending through insulators in the top of the controller casing.

77. In a controller, a casing, a drum rotatable on a vertical axis, contact-fingers coöperating therewith, conductors leading from said fingers around the inside of the controller casing, vertical conductors attached to said first mentioned conductors and extending through insulators in the top of the controller casing, the controller casing being removable and containing oil in which the controller contacts are immersed, and means for raising and lowering said casing.

78. A controller comprising a frame-work, coöperating contacts supported by said frame-work, a casing containing oil in which the contacts are normally immersed, and means supported by the frame-work on either side and attached to opposite points of the casing for raising and lowering said casing.

79. A controller comprising a frame-work, coöperating contacts supported by said frame-work, a casing containing oil in which the contacts are normally immersed, and a plurality of chain hoists also supported by said frame-work and attached to different points around said casing to raise and lower it.

80. A motor control system comprising a plurality of motors, a starting controller, a switch for each motor for directly connecting it to the line, a switch for connecting any motor to the starting controller, and interlocking mechanism for preventing the starting controller, unless it is in "off" position, from being connected to any of the motors, but allowing any switch to be opened at any time.

81. A motor control system, comprising a plurality of motors, and a single starting controller therefor so connected and arranged that said motors can be started only in turn by repeating similar movements of the controller, but that one motor can be left running while another motor is started.

82. A motor control system, comprising a plurality of motors, a single controller, and connections whereby said controller can control any one of said motors only separately by repetitions of a certain movement, but can leave one motor running while it controls another.

83. In combination, a plurality of induction motors, auto-transformer windings, a drum controller, and connections and switches so arranged that said controller may start said motors in turn in any desired order by first connecting the terminals of the motor to be started to different points of the auto-transformer windings and then connecting said motor terminals directly to the line.

84. In a potential starter, an auto-transformer winding, a preventive resistance, contact fingers, and a rotatable drum provided with a diagonal row of contact segments for coöperating with certain of said fingers to connect a lead to different points on said auto-transformer winding and a circular row of contact segments coöperating with one of said contact fingers to connect said preventive resistance momentarily in circuit as said first mentioned contact segments change the connections of said lead from one point of said auto-transformer winding to another.

85. In a potential starter, an auto-transformer winding, a preventive resistance, contact fingers, and a rotatable drum provided with a circular row and a diagonal row of contact segments for coöperating with certain of said fingers to connect a lead to different points on said auto-transformer winding and a second circular row of contact segments staggered circumferentially with respect to said first circular row and coöperating with one of said contact fingers to connect said preventive resistance momentarily in circuit as said first mentioned contact segments change the connections of said lead from one point of said auto-transformer winding to another.

86. In a potential starter, an auto-transformer winding, a preventive resistance, contact fingers, and a rotatable drum provided with a circular row and a diagonal row of contact segments for coöperating with certain of said fingers to connect a lead to different points on said auto-transformer winding and a second circular row of contact segments staggered circumferentially with respect to said first circular row and coöperating with one of said contact fingers to connect said preventive resistance momentarily in circuit as said first mentioned contact segments change the connections of said lead from one point of said auto-transformer winding to another, each contact of the second circular row being connected to those contacts of the other rows which next follow it circumferentially in a forward movement of the drum.

87. In a potential starter, auto-transformer windings, preventive resistances, and controlling drums, the latter being operable together, and a row of contact fingers for each drum, each drum being provided with a diagonal row of contact segments for coöperating with certain of said fingers to connect a lead to different points on one of the auto-transformer windings and a circular row of contacts coöperating with one of said contact fingers to connect one of the preventive resistances momentarily in circuit as the first mentioned contact segments change the connections of said lead from one point of said auto-transformer winding to another.

88. In a potential starter, auto-transformer windings, preventive resistances, and controlling drums, the latter being operable together, and a row of contact fingers for each drum, each drum being provided with a circular row and a diagonal row of contact segments for coöperating with certain of said fingers to connect a lead to different parts on one of the auto-transformer windings and a second circular row of contact segments staggered circumferentially with respect to said first circular row and coöperating with one of said contact fingers to connect one of the preventive resistances momentarily in circuit as the first mentioned contact segments change the connections of said lead from one point of said auto-transformer winding to another.

89. In a potential starter, auto-transformer windings, preventive resistances, and controlling drums, the latter being operable together, and a row of contact fingers for each drum, each drum being provided with a circular row and a diagonal row of contact segments for coöperating with certain of said fingers to connect a lead to different parts on one of the auto-transformer windings and a second circular row of contact segments staggered circumferentially with respect to said first circular row and coöperating with one of said contact fingers to connect one of the preventive resistances momentarily in circuit as the first mentioned contact segments change the connections of said lead from one point of said auto-transformer winding to another, each contact of the second circular row being connected to those contacts of the other rows which next follow it circumferentially in a forward movement of the drum.

In testimony whereof I affix my signature, in the presence of two witnesses.

HERBERT W. CHENEY.

Witnesses:
  GEO. B. SCHLEY,
  FRED J. KINSEY.